United States Patent

[11] 3,561,679

| [72] | Inventor | Sam E. Lager<br>385 La Cumbre Road, Somis, Calif. 93066 |
|---|---|---|
| [21] | Appl. No. | 740,836 |
| [22] | Filed | June 25, 1968 |
| [45] | Patented | Feb. 9, 1971 |

[54] COLLAPSIBLE NOZZLE FOR AIRCRAFT ROCKET MOTORS
4 Claims, 5 Drawing Figs.

[52] U.S. Cl. ..................................................... 239/265.11,
89/1.8
[51] Int. Cl. ........................................................ B63h 11/00;
B64d 33/04
[50] Field of Search ............................................ 239/265.11,
265.13, 265.19, 265.33; 60/271; 89/1.819

[56] References Cited
UNITED STATES PATENTS

| 2,637,163 | 5/1953 | Brown et al. | 239/265.35 |
| 2,683,961 | 7/1954 | Britton et al. | 60/271 |
| 3,011,309 | 12/1961 | Carter | 239/265.11 |
| 3,183,664 | 5/1965 | Divone | 239/265.33 |
| 3,270,504 | 9/1966 | Ward | 239/265.33 |

*Primary Examiner*—Samuel Feinberg
*Attorneys*—Q. Baxter Warner, George J. Rubens and Gayward N. Mann ABSTRACT: A nozzle for rocket motors formed of collapsible telescoping tubes which are extended upon launch to a predetermined nozzle length whereby the advantage of reduced space during shipping and stowage may be combined with the advantage of extended nozzle length during operation.

PATENTED FEB 9 1971

3,561,679

INVENTOR.
SAMUEL E. LAGER

BY
Hayward N. Mann
W. Baxter de Tarver
ATTORNEYS

3,561,679

COLLAPSIBLE NOZZLE FOR AIRCRAFT ROCKET MOTORS

The invention described herein may be manufacture and used by or for the Government of the United States of America for governmental purposes without the payment of any royalties thereon or therefor.

BACKGROUND OF THE INVENTION

1. Field of the Invention

The present invention relates to propulsion nozzles for rocket motors and particularly to propulsion nozzles of rockets which are normally carried on the undersurface of an airplane wing and which are fired from such position.

2. Description of the Prior Art

It has been found that the performance of a rocket motor can be improved by increasing the nozzle length and maintaining optimum nozzle configuration. By such means increased thrust may be obtained. Unfortunately initial construction of rockets with nozzles of optimum size renders them long and unwieldy and creates shipment and storage problems.

Heretofore it has been proposed to vary the size of jet engine exhausts and the like by hinging the sidewalls or by mechanically extending their length with a gear arrangement. An automatic extension of the nozzle has also been proposed in which a spring restrained sleeve is extended rearward by a distance proportional to the propellant gas pressure. However practically all such prior art devices have proved unsatisfactory.

SUMMARY OF THE INVENTION

The present invention provides means for varying the nozzle exit configuration of a rocket motor and includes an arrangement of collapsible telescoping tubes which are connected to the afterend of a rocket motor and are extended upon rocket launch.

By use of such a collapsed or telescoped nozzle, reduced shipping and stowage space is required, and yet at the time of use an improved exit configuration is provided having increased thrust.

An object of the present invention is to provide a rocket motor nozzle which is extended upon rocket launch.

It is another object of the invention to provide a rocket nozzle which can be shortened so as to reduce the shipping and stowage space requirements.

Still another object of the invention is to provide a variable rocket motor nozzle.

A object of the invention is to provide a nozzle configuration for externally mounted air launched rockets which will occupy a small area until the rocket is fired thereby minimizing drag.

Other objects, advantages, and novel features of the invention will become apparent from the following detailed description of the invention when considered in conjunction with the accompanying drawings.

Figure 1:
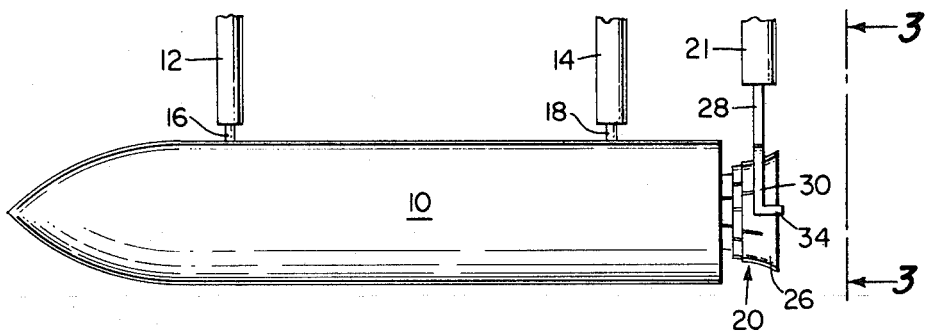
FIG. 1 is a side elevational view of an air launch rocket showing the nozzle of the present invention in the collapsed condition.
Figure 2:
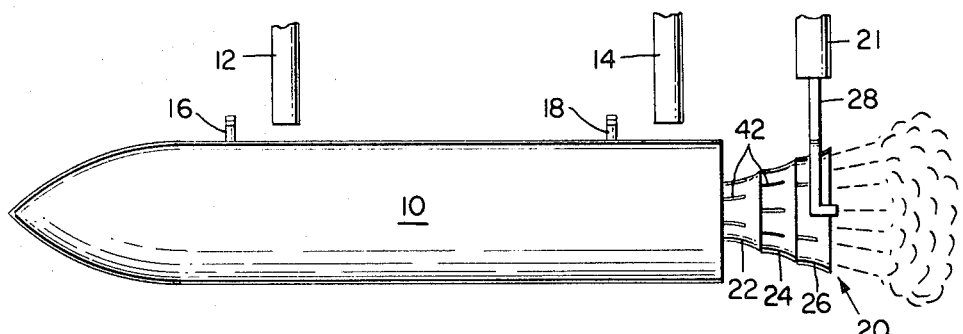
FIG. 2 is a view similar to FIG. 1 with the nozzle in its extended position.
Figure 4:
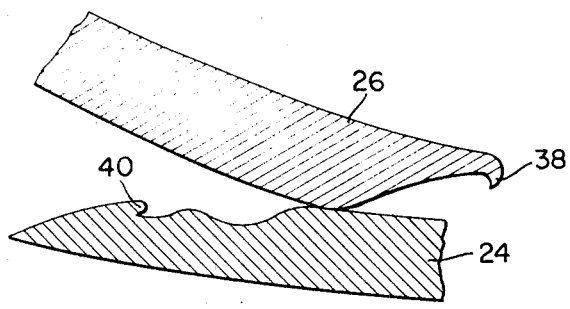
FIG. 4 is an enlarged detail sectional view showing the sealing arrangement between the telescoping tubes of the collapsible nozzle when in its collapsed position.

A suitable detent 28 located adjacent the after edge of the outer telescoped tube 26 is supported on a rear pylon 21 and anchors the nozzle 20 to its mooring device and maintains the tubes in collapsed and nested arrangement prior to the actual firing of the rocket motor 10. The detent 28 as shown best in FIG. 3 may be in the shape of a yoke having a pair of opposed arms 30, 32 extending part way about the outer concentric tube 26 with each arm being severably connected thereto at 34, 36.

It will be apparent that when removed from storage and installed under the plane wing the nozzle is collapsed. During the installation the frangible detents or couplings 34–36 are attached to connect the lower ends of yoke arms 30—32 to the rear edge of the outermost tube 26.

When the rocket is fired it moves forward extending each tube in turn to its full length until eventually the last of the several tubes is extended. Detents 34, 36 then rupture, permitting the freed rocket to travel with the advantage of increased engine thrust.

Figure 3:
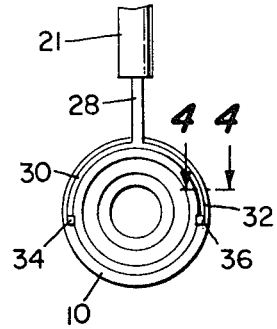
FIG. 3 is an end view of the nozzle with the nozzle detent attached to both the mooring device and the outer telescoping tube.
Figure 5:
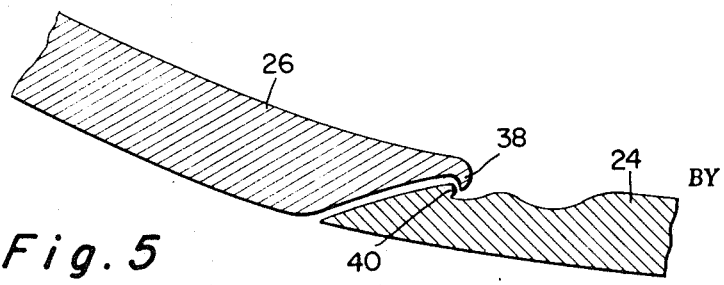
FIG. 5 is an enlarged detail sectional view showing the sealing arrangement between the collapsible tubes when fully extended. DESCRIPTION OF THE PREFERRED EMBODIMENT Referring now to the drawings wherein like reference characters designate like parts through out the several views, there is shown a rocket 10 suspended from an aircraft wing by mounting pylons 12 and 14 through mounting lugs 16 and 18. A nozzle 20 extends axially from the afterend of the rocket. As shown in the drawing, the nozzle 20 may be formed from a plurality of concentric tubes 22, 24, 26 telescoped one within the other. Each telescoped tube is successively larger in diameter as the afterend of the nozzle is approached.

As best shown in FIG. 3 each of the tubes may be provided with an inwardly directed shoulder 38 which locks in a sealing engagement with an outwardly directed lip 40 at the extended position of the telescoped tubes. Thus, a substantially tight joint is provided between the fully extended tubes. To permit limited movement of the shoulder 38 the tubes may be provided with short slits about their periphery as at 42.

The telescoped nozzle 20 when extended may be of varying size depending upon the design of the rocket motor. By varying the nozzle length and width, a more favorable exit area of the nozzle may be achieved thereby obtaining the advantage of increased engine thrust. Moreover when not in use, the collapsed position of the nozzle permits a better use of available storage space.

Obviously many modifications and variations of the present invention are possible in the light of the above teachings. It is therefore to be understood that within the scope of the appended claims the invention may be practiced otherwise than as specifically described.

I claim:

1. A nozzle for a rocket motor said nozzle comprising:
a plurality of interconnected and telescoping concentric tubes operably attached to the afterend of the rocket motor and having both collapsed and extended positions in respect to the rocket motor;
each tube being slit at the periphery thereof to permit interlocking movement when fully extended; and
means for extending the tubes from a collapsed position to an extended position when the rocket motor is launched including a frangible detent positioned in the periphery of the outermost tube and severably connected to a suitable mooring device, said detent being in the shape of a yoke having a pair of opposed arms extending part way about the outer concentric tube with each arm being connected to said concentric tube by a frangible pin.

2. The nozzle of claim 1 wherein the concentric tubes in the extended position gradually increase in diameter from the afterend of the rocket motor to the afterend of the tubes thus varying the nozzle length and width and providing increased thrust to the rocket motor.

3. The nozzle of claim 2 wherein the concentric tubes in the extended position are adapted to lock in sealing fluidtight engagement by suitable locking members inherently located on each tube.

4. The nozzle of claim 3 wherein the locking members include an outwardly directed lip an an inwardly directed shoulder of adjacent concentric tubes which are adapted to lock in sealing engagement at the extended position of said tubes.